United States Patent [19]

Hellsten et al.

[11] Patent Number: 4,476,323

[45] Date of Patent: Oct. 9, 1984

[54] SURFACE-ACTIVE QUATERNARY AMMONIUM COMPOUNDS FOR TREATMENT OF TEXTILES AND CELLULOSIC MATERIALS

[76] Inventors: Karl M. E. Hellsten, Varsaddsvagen 4, S 444 05 Odsmal; Jan G. Emanuelsson, Nattviolsvagen 8, S 444 00 Stenungsund; Svante L. Wahlen, Mogatan 3, S 444 00 Stenungsund; Axel I. Thebrin, Bokgatan 5, S 444 00 Stenungsund, all of Sweden

[21] Appl. No.: 237,800

[22] Filed: Feb. 24, 1981

[51] Int. Cl.³ .............................................. C07C 95/02
[52] U.S. Cl. .................................... 564/294; 564/287; 564/288; 252/8.8; 162/158; 162/182; 162/186; 162/201
[58] Field of Search ....................... 564/285, 287, 294; 162/158, 182, 186, 201

[56] References Cited

U.S. PATENT DOCUMENTS

| | | | |
|---|---|---|---|
| 3,919,319 | 11/1975 | Hintermeier et al. | 564/294 |
| 3,972,855 | 8/1976 | Martinsson et al. | 564/294 |
| 4,074,970 | 2/1978 | Feigin | 564/285 |
| 4,134,970 | 1/1979 | Panke et al. | 564/287 |
| 4,144,122 | 3/1979 | Emanuelsson et al. | 162/158 |
| 4,240,984 | 12/1980 | Harris et al. | 564/285 |
| 4,281,196 | 7/1981 | Rutzen et al. | 564/294 |

*Primary Examiner*—James H. Reamer

[57] ABSTRACT

The invention relates to new surface-active quaternary ammonium compounds having the general formula:

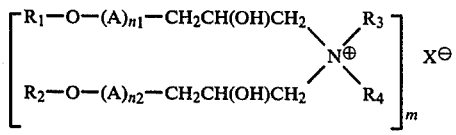

wherein:

$R_1$ and $R_2$ are each hydrocarbon groups having from about twelve to about forty carbon atoms;

$R_3$ and $R_4$ are selected from the group consisting of methyl, ethyl and hydroxyethyl;

A is an oxyalkylene group derived from both ethylene oxide and propylene oxide, having a ratio of oxyethylene units to the total number of oxyalkylene groups within the range from about 1:6 to about 5:6;

m is a number corresponding to the valence of X;

$n_1$ and $n_2$ represent the average number of oxyalkylene units and are within the range from about 6 to about 30; and X is an anion.

The compounds impart to the treated textiles and cellulosic materials a reduced tendency to retain an electrostatic charge and/or improved softness and/or reduced mechanical strength due to a reduction in interfiber bonding, and at the same time preserve good hydrophilic properties.

14 Claims, No Drawings

SURFACE-ACTIVE QUATERNARY AMMONIUM COMPOUNDS FOR TREATMENT OF TEXTILES AND CELLULOSIC MATERIALS

When washing textile materials of synthetic fibers, such as polyamide or polyacrylonitrile fibers, a cationic surface-active compound is usually added to the last rinsing water, to increase softness and to reduce the retention of electrostatic charge. A typical cationic compound is difattyalkyl dimethyl quaternary ammonium chloride. These cationic compounds are applied to the textile as an aqueous dispersion in a concentration of 3 to 7% cationic surface-active compound. These dispersions generally have a high viscosity and are turbid liquids after storage, and especially after repeated freezing and thawing, separate into two layers which have to be stirred to redisperse them before use. A considerable disadvantage of such cationic surface-active compounds is that they generally reduce the water absorptivity of the treated textile material, which is particularly undesirable for textiles used as towelling.

In order to avoid the disadvantages of difattyalkyl dimethyl quaternary ammonium compounds, U.S. Pat. No. 3,932,495, patented Jan. 13, 1976 to Martinsson and Hellsten, and U.S. Pat. No. 3,972,855, patented Aug. 3, 1976 to Martinsson and Hellsten, provide quaternary ammonium compounds having the general formula:

| Cation | Anion |
|---|---|
| 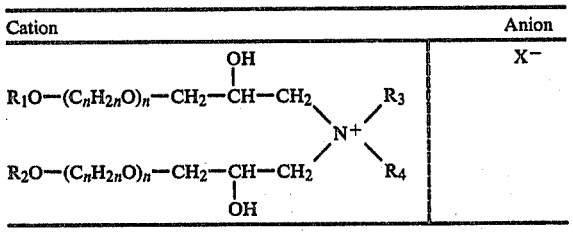 | $X^-$ |

In this formula:

$R_1$ and $R_2$ are aliphatic hydrocarbon groups, which can be either saturated or unsaturated, having from about eight to about twenty-two carbon atoms.

$R_3$ and $R_4$ are methyl, ethyl or hydroxyethyl.

n is a number from 2 to 4, representing the number of carbon atoms in the oxyalkylene substituent, which can thus be oxyethylene, oxypropylene-1,2 or -1,3 or oxybutylene-1,2 -1,3, -1,4 or -2,3.

$n_1$ and $n_2$ are numbers within the range from 0 to about 10, representing the number of oxyalkylene groups present in each substituent, $n_1$ and $n_2$ usually represent average values, and therefore need not be integers.

X is a salt-forming anion, and can be organic or inorganic.

These quaternary ammonium compounds impart superior antistatic properties to substrates than the alkyl quaternary ammonium compounds. The improvement in antistatic properties is believed due to the presence of the 2-hydroxy-oxypropylene group. The addition of the oxyalkylene units also improves antistatic properties as well as softening properties, while at the same time preserving good hydrophilic properties. Compounds having no or from one to two oxyalkylene groups and one 2-hydroxy-oxypropylene group attached to the aliphatic hydrocarbon group impart the best antistatic and softening properties, and are therefore preferred. In these compounds, $n_1$ and $n_2$ are numbers within the range from 0 to 2.

Those compounds having a short alkyl chain, i.e., an alkyl chain with eight to fourteen carbon atoms, and with n=0, i.e., without oxyalkylene units, have a good freeze-thaw-stability. However, when the number of oxyalkylene units per chain exceeds 2, there is a decrease in the ability of the compounds to give to the textile a soft hand, and to prevent the formation of an electrostatic charge. Furthermore, the compounds reduce the water absorptivity, although the decrease is not as great as with difattyalkyl dimethyl quaternary ammonium compounds.

U.S. Pat. No. 4,144,122, patented Mar. 13, 1979 to Emanuelsson and Wahlen, suggested quaternary ammonium compounds having the general formula:

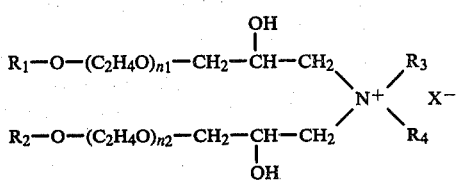

In this formula:

$R_1$ and $R_2$ are aliphatic hydrocarbon groups, which can be either saturated or unsaturated, having from about eight to about twenty-two carbon atoms.

$R_3$ and $R_4$ are methyl, ethyl and hydroxyethyl.

$n_1$ and $n_2$ are numbers within the range from 2 to about 10, representing the number of oxyethylene groups present in each substituent, and usually represent average values, and therefore need not be integers.

X is a salt-forming anion, and can be organic or inorganic.

These quaternary ammonium compounds are said to reduce interfiber bonding and provide by the treatment cellulose pulp or paper with good hydrophilicity (wettability) and low mechanical strength. Generally, it can be said that as the number $n_1$ and $n_2$ of oxyethylene units increases from two to ten, the hydrophilicity (wettability) of the cellulose pulp or paper increases, while the number of interfiber bonds between cellulose chains is somewhat increased. As the number of carbon atoms in the substituents $R_1$ and $R_2$ increases, the hydrophilicity (wettability) decreases, and the effect on the number of interfiber bonds between cellulose chains is reduced. Thus, by appropriately adjusting the number of carbon atoms in $R_1$ and $R_2$ and the number $n_1$ and $n_2$ of oxyethylene units, it is possible to obtain any desired combination of hydrophilicity (wettability) and reduction of the interfiber bonds between cellulose chains, as required for the particular use. An optimum balance in wettability and in effect on interfiber bonds is obtained when $R_1$ and $R_2$ have from about fourteen to about twenty carbon atoms; $R_3$ and $R_4$ are methyl or ethyl groups; and $n_1$ and $n_2$ are numbers within the range from 2 to about 6.

These quaternary ammonium compounds are added to the wet cellulose pulp after delignification or bleaching, either before or during the formation into sheets or continuous webs on the cellulose pulp machine or a paper machine.

In French Pat. No. 2,258,892, quaternary ammonium compounds are described, which have a structure similar to the compounds in U.S. Pat. No. 4,144,122, but the hydrophobic parts of the compounds consist of aromatic hydrocarbon residues. These compounds also reduce the strength of interfiber bonding while limiting decrease of the natural hydrophilicity of the cellulose.

In accordance with the present invention, quaternary ammonium compounds are provided having the general formula:

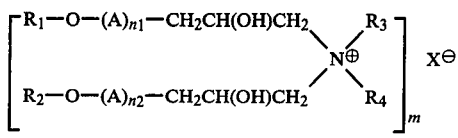

wherein:

$R_1$ and $R_2$ are each hydrocarbon groups having from about twelve to about forty carbon atoms;

$R_3$ and $R_4$ are selected from the group consisting of methyl, ethyl and hydroxyethyl;

A is an oxyalkylene group derived from both ethylene oxide and propylene oxide, having a ratio of oxyethylene units to the total number of oxyalkylene groups within the range from about 1:6 to about 5:6;

m is a number corresponding by the valence of X;

$n_1$ and $n_2$ represent the average number of oxyalkylene units and are within the range from about 6 to about 30; and X is an anion.

The compounds impart to the treated textiles and cellulosic materials a reduced tendency to retain an electrostatic charge and/or improved softness and/or reduced mechanical strength due to a reduction in interfiber bonding, and at the same time preserve good hydrophilic properties.

These compounds display a considerably improved balance of properties, as compared to prior quaternary ammonium compounds. Especially remarkable, these compounds at worst only slightly reduce the hydrophilicity of the substrate, i.e., textile or cellulosic material, and at best increase hydrophilicity. As a result the dosage level can be increased.

Compounds in which $R_1$ and $R_2$ are aliphatic hydrocarbon or alkyl phenyl hydrocarbon having from twelve to thirty carbon atoms and $R_3$ and $R_4$ are methyl are preferred.

Particularly suited as additives for treatment of textiles are compounds where $R_1$ and $R_2$ are aliphatic hydrocarbon having from twelve to twenty-two carbon atoms, and n has an average value of 6 to 15.

In the production of cellulose fluff, compounds where $R_1$ and $R_2$ are alkyl phenyl having from fourteen to thirty carbon atoms and n is within the range from 8 to 30 are preferred.

The compounds according to the invention give clear, low viscosity aqueous solutions of concentrations of 3 to 10% by weight.

The compounds according to the invention generally impart or retain higher hydrophilicity in the substrate, compared to previously used quaternary ammonium compounds, while maintaining softness and reducing interfiber bonding to the same degree. It is very remarkable that oxypropylene units, which would be expected to impart a hydrophobic character, in this case impart improved hydrophilicity.

An enhanced effectiveness in these respects can be obtained when the quaternary ammonium compounds of the invention are combined with a nonionic surface-active alkylene oxide adduct, such as adducts obtained by reacting aliphatic alcohols or alkyl phenols or aromatic or aliphatic acids with ethylene oxide, propylene oxide, or a mixture thereof. These compounds have the general formula:

$$R_5O(Y)_nH$$

wherein:

$R_5$ is selected from the group consisting of hydrocarbon and acyl hydrocarbon having from about twelve to about forty carbon atoms;

Y is an oxyalkylene group derived from ethylene oxide or propylene oxide or a mixture thereof; and n represents the average of the number of oxyalkylene groups and is within the range from 6 to 30.

The amount of nonionic surface-active alkylene oxide adduct is normally within the range from 0.1 to about 400%, preferably from 10 to 250%, by weight of the quaternary ammonium compound according to the invention.

The cationic active compounds of the invention are easy to produce on an industrial scale. They can be obtained by the conventional reaction of from 6 to 30 moles of ethylene oxide or propylene oxide or mixture thereof with an alcohol or alkyl-substituted phenol having from twelve to forty carbon atoms; reacting the reaction product with epichlorhydrin to form the corresponding chloro glyceryl ether; and reacting this chloro glyceryl ether with a secondary amine of the general formula:

$$R_6R_7NH$$

where $R_6$ and $R_7$ are each methyl or ethyl or hydroxy ethyl to form a quaternary ammonium chloride.

If suitable, chloride anion can be exchanged for other anions, for example by the addition of a sodium salt with a higher solubility constant than sodium chloride, or by ion exchange in an anion exchanger. Anions in addition to chloride include hydroxyl, bromide, methylsulphate, acetate, sulphate, carbonate, citrate and tartrate, and of these the monovalent anions are preferred.

The compounds according to the invention can also be manufactured by reaction of the chloro glyceryl ether with methyl or ethyl chloride or dimethyl or diethyl sulphate. However, this method is more complicated, and gives a larger number of byproducts and a lower total yield.

A more detailed description of the method of production and suitable reaction conditions which can be used when producing the compound is to be found in U.S. Pat. No. 3,932,495, to Martinsson and Hellsten, patented Jan. 13, 1976.

Alcohols for manufacturing the compounds contain from eight to twenty-two carbon atoms. Synthetic and natural alcohols can be used. The natural so-called fatty alcohols are generally manufactured by reduction of the mixed fatty acids or fatty acid esters derived from vegetable oils, such as the fatty alcohols from coconut oil, palm oil, soy oil, linseed oil, corn oil or castor oil; or animal fats and oils such as fish oil, whale oil, tallow or lard. Suitable alcohols include octyl alcohol, 2-ethylhexyl alcohol, isooctyl alcohol, nonyl alcohol, decyl alcohol, dodecyl alcohol, tetradecyl alcohol, cetyl alcohol, palmityl alcohol, myristyl alcohol, stearyl alcohol, eicosyl alcohol, behenyl alcohyl, oleyl alcohol and eicosenyl alcohol. Synthetic alcohols are manufactured usually by the Ziegler procedure or the OXO-process. Most alcohols manufactured according to the OXO-process have a more or less branched carbon chain, which makes a large number of isomers possible. The physical and chemical properties of these alcohols are very similar to those of the straight chain primary alcohols.

Examples of suitable alkyl phenols which can be used in manufacturing the compounds according to the invention are octyl phenol, nonyl phenol, decyl phenol, dodecyl phenol, tetradecyl phenol, hexadecyl phenol, octadecyl phenol, eicosyl phenol, dioctyl phenol, dinonyl phenol, didecyl phenol, didodecyl phenol, ditetradecyl phenol, dihexadecyl phenol, dioctadecyl phenol, tributyl phenol, trihexyl phenol, trioctyl phenol, tridecyl phenol and tridodecyl phenol. Octadecyl phenol, didecyl phenol, didodecyl phenol and ditetradecyl phenol are preferred.

Secondary amines suitable for use in the invention are dimethyl amine and diethyl amine, which are commercially available. The primary amines that may be used are methyl and ethyl amine.

The quaternary compounds in accordance with the invention can be applied to the substrate in the form of solids, such as powders or pastes, or as solutions, in water or in an organic solvent. In such solutions, the concentration of quaternary ammonium compound can range from about 0.01 to about 25%, preferably from about 3 to about 10%.

In the case of solutions for application to textile materials, the concentration of the quaternary ammonium compound can be within the range from about 0.01 to about 0.5 gram, and preferably from about 0.05 to about 0.15 gram, per liter of solution. Aqueous solutions of such concentrations are quite useful, for example, as rinsing solutions at any of the stages of textile processing during which aqueous rinsing solutions are used. Due to their good affinity for textile fibers, the quaternary ammonium compounds can be introduced into any rinsing solution in the course of the process, but the best and most lasting effect is obtained if the quaternary ammonium compound is included in the last rinsing solution.

The compounds can also be added at the prewash or in the main wash operations, but in these cases the antistatic effects may be less per unit weight of compound applied to the textile material, probably because of losses of the compound during later processing.

The usual solvent used is water. However, if rapid volatilization of the solvent is desired, the quaternary ammonium compounds of the invention can be applied from a solution in a rapidly volatilizable organic solvent, such as acetone, methanol, ethanol, isopropanol, or mixtures thereof. In this case, the concentrations are the same as aqueous solutions, within the range from about 5% to about 10% by weight of the quaternary ammonium compound.

The solutions of the quaternary ammonium compounds of the invention can also be applied by dipping, spraying, or coating, using conventional techniques. This sort of application is useful on textile materials which normally are very seldom washed, or are not washed at all, or on leather or plastic sheet material, or on plastic films coated on other base such as wood. When applied in this way, the composition usually contains the quaternary ammonium compound in a concentration within the range from about 5% to about 10%.

Besides the active substance, the composition may contain, for example, solubilizing additives, such as ethyldiethylene glycol, in order to reduce the viscosity of the solution. It is also possible to incorporate nonionic surfactants, such as adducts obtained by reacting aliphatic alcohols, alkyl phenols, aliphatic acids or aromatic acids with ethylene oxide or a mixture of ethylene oxide and higher alkylene oxides, thus improving the wettability of the treated textile material.

The quaternary ammonium compounds of the invention are applied to the substrate in an amount within the range from about 0.001% to about 2% by weight of the substrate.

The compounds of the invention impart antistatic properties to textile materials of all kinds including both woven and nonwoven materials made of natural or synthetic fibers or mixtures thereof, such as, for example, rayon, acetate rayon, cellulose acetate-propionate, cellulose acetate-butyrate, polyvinyl chloride, polyamide, polypropylene, polyethylene, polyacrylonitrile, polyesters such as ethylene glycol-terephthalic acid polymers, cotton, linen, jute, ramie, sisal, wool, mohair, alginate fibers, zein fibers, glass, potassium titanate, bast, bagasse, polyvinylidene chloride, and fur fibers of various kinds such as beaver, rabbit, seal, muskrat, otter, mink, caracul, lamb and aquirrel.

The textile materials can take any form, including nonwoven materials such as felts, bats and mats; woven materials such as fabrics, cloth, carpets, rugs and upholstery; synthetic fur materials; curtains, and covering materials of all kinds.

The compounds of the invention are applicable to impart antistatic properties to leather materials, such as leather furniture and leather clothing.

They are also applicable to plastic surfaces, many of which have a pronounced tendency to develop a static charge, such as synthetic phonograph records which are usually made of polyvinyl chloride; to painted, varnished and lacquered surfaces which bear a synthetic resinous coating film; to metal foils, and chassis for electric and electronic devices, such as radios, hi-fi's, phonograph systems, sound amplification systems, amplifiers, television, and sound-recording equipment.

The compounds according to the invention can be added to cellulosic material such as cellulose fibers, cellulose pulp, or cellulose fluff, at any time after bleaching. Generally, the compounds are added before or during the drainage or drying, for example, during the manufacture of a continuous web on a cellulose machine or paper machine or of flakes in a flash dryer. The cellulose pulp can be any type of pulp, such as mechanical pulp, semichemical pulp as well as chemical pulp. Thus the compounds in question have proved a considerably good effect on mechanical or semichemical pulp as well as chemical pulp, such as sulphite or sulphate pulp, the latter generally used for manufacturing soft products with good water absorptivity.

The compounds are generally applied to the material in the form of an aqueous solution having a concentration of 1 to 15% by weight of the compound. To this solution viscosity reducing additives can also be added, like ethanol, or the ethyl ether of diethylene glycol.

The amount of quaternary ammonium compound according to the invention that is applied to the substrate varies according to the desired effect, but normally it is from 0.01 to 1.5, preferably from 0.02 to 1.0% based on the dry weight of the cellulosic material.

The cellulosic material or paper treated with compounds according to the invention can be used for different purposes. For example, cellulose pulp can be defibrated into cellulose fluff, and in this form it may be included in different hygienic products. Furthermore, the compounds can be used for production of papers whose softness is of great importance, such as toilet paper, hygienic tissues, tissue paper, paper sheets, paper fabrics, paper towels, paper tablecloths and paper clothing.

The following Examples represent preferred embodiments of the invention:

EXAMPLE 1

Into a container provided with heater, stirrer and reflux cooler, 322.4 g of a 1:1 mixture of cetyl alcohol and stearyl alcohol and 4 g KOH as an aqueous 40% solution were introduced. The water was removed down to less than 0.05% under vacuum and heating, and then 299.3 g ethylene oxide and 378.2 g propylene oxide were introduced gradually over one hour. The temperature of the reaction was kept at 130° C. After the reaction, the mixture was cooled to 80° C., neutralized, and filtered. The yield was 964 g mixed stearyl-cetyl alcohols alkylene oxide adduct.

724 g of this adduct was introduced into another reaction vessel together with 3.7 g SnCl$_4$, and the whole was heated to 60° C., whereupon 86 g epichlorhydrin was added over one hour. After a reaction time of another sixty minutes, the SnCl$_4$ catalyst was neutralized with 10% caustic soda, and the crystallized NaCl was filtered off.

In an autoclave provided with heater and stirrer 810 g of the above obtained reaction product, 19 g dimethyl amine, 44.5 g 46% NaOH and 20 g water were introduced at a temperature of 60° to 70° C. The temperature was then raised to 100° C. over three hours, and the remaining dimethyl amine removed by nitrogen gas. The end product, a faintly beige viscous substance, obtained in an 85% yield, had the general formula:

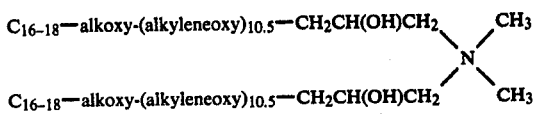

where alkyleneoxy is mixed oxyethylene oxypropylene derived from ethylene oxide and propylene oxide, the ratio of oxyethylene to the total number of oxyalkylene being 7:15.

The product was miscible with water in all proportions and gave clear low viscosity solutions at a concentration up to 20% by weight, and gel-like solutions at higher concentrations.

In a beaker containing 0.8 liter water of a hardness of 5° dH, at 22° C., 50 mg of the foregoing compound was dissolved, whereafter textile test pieces were added to the solution and the whole was stirred for five minutes. Terry cloth and polyamide fabric were used as test pieces. After having been centrifuged and dried, the terry cloth pieces were examined with respect to softness and water absorptivity, and the polyamide pieces with respect to electrical conductivity. In order to compare, tests were also carried out with untreated test pieces and test pieces treated with the cationic prior art compound

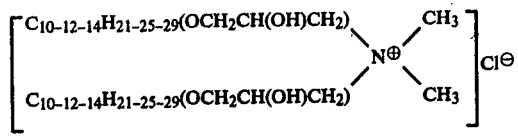

A test panel rated the samples on a scale of 1 to 3, with 1 being worst and 3 being best. The conductivity was determined by applying an initial potential of 100 volts in a static voltmeter made by Rothschild, and measuring the time required for the voltage to drop to 50 volts.

The water absorptivity of the terry cloth was determined by pressing a circular sample treated with 1 g per kilogram terry cloth of the compound of Example 1 towards the surface of a glass fiber plate, the underside of which was totally in contact with a known volume of water, and measuring the reduction of the water volume as a function of time. The following results were obtained:

TABLE I

| Additive | Softness | Water absorptivity ml water/g dry textile after 50 seconds | Antistatic effect half-life/ second |
| --- | --- | --- | --- |
| None | 1.0 | 3.1 | 300 |
| Compound of Example 1 | 2.8 | 3.0 | 46 |
| Comparison compound | 2.2 | 2.0 | 103 |

From the results it is evident that the compound according to the invention gives a somewhat better softness than the comparison compound, at the same time as the water absorptivity obtained is considerably better and only slightly inferior to the water absorption of the untreated terry cloth. The antistatic effect upon polyamide cloth of the compound according to the invention is better than that of the comparison compound.

EXAMPLE 2

Into a container provided with heater, stirrer and reflux cooler, 345 kg of dinonyl phenol and 17.8 kg KOH as an aqueous 40% solution were introduced. The water was removed down to less than 0.05% under vacuum and heating, and then 14 kmoles (2400 kg) of a 30:70 mixture of ethylene oxide and propylene oxide were introduced gradually over one hour. The temperature of the reaction was kept at 130° C. After the reaction, the mixture was cooled to 80° C., neutralized, and filtered. The yield was 2245 kg dinonyl phenol alkylene oxide adduct.

7410 kg of the adduct was introduced into another reaction vessel together with 60 kg SnCl$_4$, and the whole was heated to 60° C., whereupon 720 kg epichlorhydrin were added over one hour. After a reaction time of another sixty minutes, the SnCl$_4$ catalyst was neutralized with 10% caustic soda, and the crystallized NaCl was filtered off.

In an autoclave provided with heater and stirrer, the above obtained reaction product, 135 kg dimethyl amine, 370 kg NaOH as an aqueous 40% solution and 450 kg water and 875 kg ethyl diethylene glycol were introduced at a temperature of 60° to 70° C. The temperature was then raised to 100° C. over three hours, and the remaining dimethyl amine removed by nitrogen gas. The end product, a faintly beige viscous substance, obtained in an 85% yield, had the general formula:

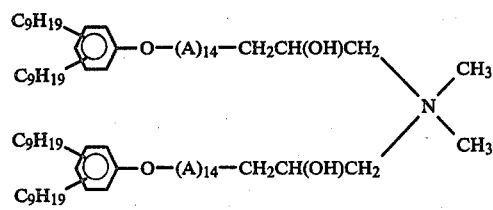

A is a mixed oxyalkylene group derived from mixed ethylene oxide and propylene oxide, the ratio of oxyethylene to the total number of oxyalkylene is 3:10. The yield was about 80%.

To bleached sulphate pulp with a pulp concentration of 2%, there was added in an amount of 0.3% by weight, based on the amount of dry pulp:

(1) a compound according to Example 1;
(2) a compound according to Example 2; and
(3) a mixture in the proportions 50:50 of a compound according to Example 2 and a nonionic surface-active alkylene oxide adduct obtained by reaction of 1 mole dinonyl phenol with a mixture of 7.2 moles ethylene oxide and 12.6 moles propylene oxide;
(4) a compound of the formula:

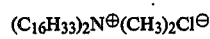

(5) a compound of the formula:

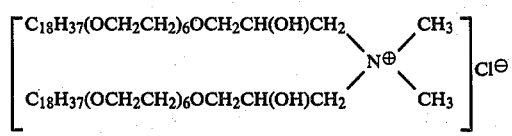

(6) a compound of the formula:

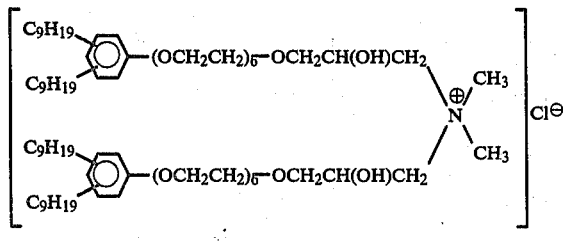

(4), (5), and (6) are Controls representing the prior art.

From the pump test sheets were formed, and after drying the test sheets were examined with respect to mechanical strength (Burst factor according to SCAN P-24:68) and water absorptivity (according to SCAN C-33:80). The results are shown in Table II.

TABLE II

| Additive | Burst factor | Water absorptivity (seconds) |
|---|---|---|
| — | 22.0 | 5.0 |
| A | 8.8 | 6.8 |
| B | 8.4 | 6.8 |
| C | 7.7 | 6.4 |
| D | 12.1 | 15.0 |
| E | 10.3 | 9.5 |

TABLE II-continued

| Additive | Burst factor | Water absorptivity (seconds) |
|---|---|---|
| F | 9.5 | 8.0 |

From the results, it is evident that cellulose pulp treated with the additives according to the invention have more favorable properties, i.e., high wettability and low mechanical strength, compared with pulp treated with any of the Controls. The addition of a nonionic surface-active alkylene oxide adduct also had a positive influence on the balance of properties.

EXAMPLE 3

Into a container provided with heater, stirrer and reflux cooler, 1 mole of dinonyl phenol and 3.5 g KOH as an aqueous 40% solution were introduced. The water was removed down to less than 0.05% under vacuum and heating, and then 11 moles of ethylene oxide and 3 moles propylene oxide were introduced gradually over one hour. The temperature of the reaction was kept at 130° C. After the reaction, the mixture was cooled to 80° C., neutralized, and filtered. The yield was 1003 g mixed dinonyl phenol alkylene oxide adduct.

1003 g of this adduct was introduced into another reaction vessel together with 5.1 g $SnCl_4$, and the whole was heated to 60° C., whereupon 1 mole epichlorhydrin was added over one hour. After a reaction time of another sixty minutes, the $SnCl_4$ catalyst was neutralized with 10% caustic soda, and the crystallized NaCl was filtered off.

In an autoclave provided with heater and stirrer 1000 g of the above obtained reaction product, 39 g dimethyl amine, 47 g 40% NaOH and 50 g water and 100 g ethyl ethylene glycol were introduced at a temperature of 60° to 70° C. The temperature was then raised to 100° C. over three hours, and the remaining dimethyl amine removed by nitrogen gas. The end product, a faintly beige viscous substance, obtained in an 83% yield, had the general formula:

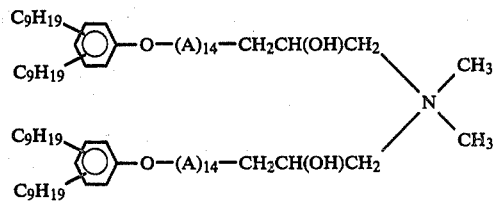

A is oxyalkylene group derived from mixed ethylene oxide and propylene oxide. The ratio of oxyethylene to the total number of oxyalkylene groups was 11:14. The yield was 83%.

For comparison, a similar prior art compound with the formula:

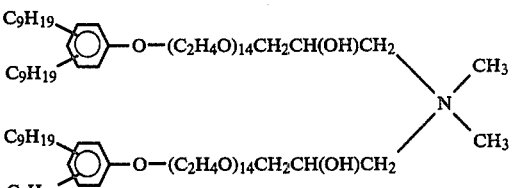

was also prepared and tested.

Both compounds were added to separate sulphate pulp slurries in a concentration of 2%.

From the pulp slurries, test sheets were formed, and after drying the test sheets were examined with respect to mechanical strength (Burst factor according to SCAN P-24:68) and water absorptivity (according to SCAN C-33:80). The following results were obtained:

TABLE III

| Additive | Burst factor | Water Absorptivity (seconds) |
|---|---|---|
| — | 24.0 | 4.8 |
| Compound according to Example 3 | 9.6 | 8.4 |
| Comparison test compound | 11.3 | 10.0 |

From the results, it is evident that the compounds according to the invention compared with the comparison compound imparted a better softness as well as higher water absorptivity. This is remarkable, as the only difference between the compounds is that some hydrophilic oxyethylene units have been replaced by more hydrophobic oxypropylene units.

Having regard to the foregoing disclosure, the following is claimed as patentable and inventive embodiments thereof:

1. Surface-active quaternary ammonium compounds having the general formula:

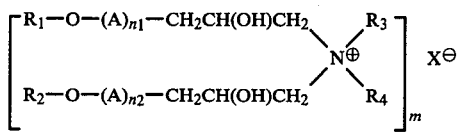

wherein:
$R_1$ and $R_2$ are each hydrocarbon groups having from about twelve to about forty carbon atoms;
$R_3$ and $R_4$ are selected from the group consisting of methyl, ethyl and hydroxyethyl;
A is an oxyalkylene group derived from both ethylene oxide and propylene oxide, having a ratio of oxyethylene units to the total number of oxyalkylene groups within the range from about 1:6 to about 5:6;
m is a number corresponding to the valence of X;
$n_1$ and $n_2$ represent the average number of oxyalkylene units and are within the range from about 6 to about 30; and
X is an anion.

2. Compounds according to claim 1 in which $R_3$ and $R_4$ are methyl.

3. Compounds according to claim 1 in which $R_1$ and $R_2$ are aliphatic hydrocarbon having from twelve to twenty-two carbon atoms, and n is within the range from 6 to 15.

4. Compounds according to claim 1 in which $R_1$ and $R_2$ are alkyl-substituted phenyl having from fourteen to thirty carbon atoms, and n is within the range from 8 to 25.

5. A process for the treatment of textiles and cellulosic materials to impart to the treated textiles and cellulosic materials a reduced tendency to retain an electrostatic charge and/or improved softness and/or reduced mechanical strength due to a reduction in interfiber bonding, and at the same time preserve good hydrophilic properties, which comprises applying to the textile or cellulosic material a compound according to claim 1.

6. A process according to claim 5 in which $R_3$ and $R_4$ are methyl.

7. A process according to claim 5 in which $R_1$ and $R_2$ are aliphatic hydrocarbon having from twelve to twenty-two carbon atoms, and n is within the range from 6 to 15.

8. A process according to claim 5 in which $R_1$ and $R_2$ are alkyl-substituted phenyl having from fourteen to thirty carbon atoms, and n is within the range from 8 to 25.

9. A process according to claim 5 in which the compound is applied as an aqueous solution.

10. A process according to claim 9 in which the concentration compound in the aqueous solution is within the range from 0.01 to 0.5 g per liter of solution.

11. A process according to claim 5 in which the compound is applied to the material as an aqueous solution containing from about 0.01 to about 25% by weight of the compound.

12. A process according to claim 5 in which the compound is applied to cellulosic material after bleaching.

13. A process according to claim 12 in which the compound is applied to material in the form of an aqueous solution having a concentration of 1 to 15% by weight of the compound.

14. A process according to claim 12 in which the cellulosic material is cellulose fluff.

* * * * *